(12) United States Patent
Yamada et al.

(10) Patent No.: US 8,675,267 B2
(45) Date of Patent: Mar. 18, 2014

(54) IMAGE READING APPARATUS, IMAGE FORMING APPARATUS AND COMPUTER-READABLE MEDIUM

(75) Inventors: Kenji Yamada, Kanagawa (JP); Kosuke Shimizu, Kanagawa (JP); Kensuke Ohara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 116 days.

(21) Appl. No.: 13/357,215

(22) Filed: Jan. 24, 2012

(65) Prior Publication Data

US 2013/0070319 A1  Mar. 21, 2013

(30) Foreign Application Priority Data

Sep. 21, 2011 (JP) ................................ 2011-206263

(51) Int. Cl.
*G03F 3/08* (2006.01)
(52) U.S. Cl.
USPC ............ 358/518; 358/505; 358/520; 358/501
(58) Field of Classification Search
USPC ......... 358/474, 501, 505, 515, 516, 518, 475, 358/520
See application file for complete search history.

(56) References Cited

U.S. PATENT DOCUMENTS

| | | | | | |
|---|---|---|---|---|---|
| 5,710,824 | A | * | 1/1998 | Mongeon | 382/162 |
| 5,900,952 | A | * | 5/1999 | Fan | 358/518 |
| 5,953,499 | A | * | 9/1999 | Narendranath et al. | 358/1.9 |
| 6,097,838 | A | * | 8/2000 | Klassen et al. | 382/167 |
| 6,178,007 | B1 | * | 1/2001 | Harrington | 358/1.9 |
| 6,546,132 | B1 | * | 4/2003 | Bhattacharjya et al. | 382/167 |
| 7,133,569 | B1 | * | 11/2006 | Saquib | 382/262 |
| 7,136,187 | B1 | * | 11/2006 | Ohkubo | 358/1.9 |
| 7,158,271 | B2 | * | 1/2007 | Sawada | 358/505 |
| 7,164,498 | B2 | * | 1/2007 | Van Bael | 358/1.9 |
| 7,206,100 | B2 | * | 4/2007 | Namikata | 358/3.23 |
| 7,492,478 | B2 | * | 2/2009 | Une | 358/1.9 |
| 7,583,420 | B2 | * | 9/2009 | Namikata | 358/518 |
| 7,586,642 | B2 | * | 9/2009 | Chiba | 358/1.9 |
| 7,593,147 | B2 | * | 9/2009 | Okamoto et al. | 358/518 |
| 7,667,873 | B2 | * | 2/2010 | Kang et al. | 358/1.9 |
| 8,305,665 | B2 | * | 11/2012 | Sakamoto et al. | 358/518 |
| 8,395,639 | B2 | * | 3/2013 | Sasaki | 345/604 |
| 8,514,453 | B2 | * | 8/2013 | Mebane | 358/2.1 |
| 2011/0013242 | A1 | * | 1/2011 | Hagio et al. | 358/520 |

FOREIGN PATENT DOCUMENTS

JP 2011-24135 A 2/2011

* cited by examiner

*Primary Examiner* — Negussie Worku
(74) *Attorney, Agent, or Firm* — Sughrue Mion, PLLC

(57) ABSTRACT

An image reading apparatus includes a conversion unit and a setting unit. The conversion unit converts first image information into second image information by using a predetermined color conversion factor group. The setting unit (i) obtains the second image information of a color sample of a plurality of colors converted by the conversion unit from the first image information, the first image information generated by reading the color sample, the color sample used to correct a color level difference according to a light source, (ii) selects a color conversion factor group corresponding to the obtained second image information of the color sample based on the correspondence relationship between a color conversion factor group and a color level of the second image information of the color sample, and (iii) sets the selected color conversion factor group instead of the predetermined color conversion factor group of the conversion unit.

7 Claims, 12 Drawing Sheets

FIG. 7A b* VALUE OF YELLOW

|  | UPPER LIMIT | LOWER LIMIT |
|---|---|---|
| LED A | 240 | 221 |
| LED B | 220 | 201 |
| LED C | 220 | 201 |

FIG. 7B a* VALUE OF CYAN

|  | UPPER LIMIT | LOWER LIMIT |
|---|---|---|
| LED A | 70 | 51 |
| LED B | 70 | 51 |
| LED C | 50 | 31 |

FIG. 8

| | b* VALUE OF YELLOW | |
|---|---|---|
| a* VALUE OF CYAN | 240~221 | 220~201 |
| 70~51 | LED A | LED B |
| 50~31 | Error | LED C |

FIG.10

| b* VALUE OF YELLOW | a* VALUE OF CYAN | | | | |
|---|---|---|---|---|---|
| | LESS THAN 30 | 30~60 | 60~70 | 70~80 | EQUAL TO OR GREATER THAN 80 |
| EQUAL TO OR GREATER THAN 240 | Error | Error | Error | LED A | LED A |
| 240~210 | LED B | LED B | Error | LED A | LED A |
| 210~190 | LED B | LED B | LED C | LED C | LED C |
| LESS THAN 190 | Error | LED C | LED C | LED C | Error |

IMAGE READING APPARATUS, IMAGE FORMING APPARATUS AND COMPUTER-READABLE MEDIUM

CROSS-REFERENCE TO RELATED APPLICATION

This application is based on and claims priority under 35 USC 119 from Japanese Patent Application No. 2011-206263 filed Sep. 21, 2011.

BACKGROUND

Technical Field

The present invention relates to an image reading apparatus, an image forming apparatus, and a computer-readable medium.

SUMMARY (1) According to an aspect of the invention, an image reading apparatus includes a conversion unit and a setting unit. The conversion unit converts first image information into second image information by using a predetermined color conversion factor group. The first image information is generated by a reading unit which reads a light irradiated from a light source onto an irradiation target and reflected from the irradiation target and which generates the first image information representing a color level in a first color space. The second image information represents a color level in a second space which is different from the first color space. The setting unit (i) obtains the second image information of a color sample of a plurality of colors converted by the conversion unit from the first image information. The first image information is generated by reading the color sample of the plurality of predetermined colors as the irradiation target by the reading unit. The color sample is used to correct a color level difference according to a light source. The setting unit (ii) selects a color conversion factor group corresponding to the obtained second image information of the color sample of the plurality of colors based on the correspondence relationship between a color conversion factor group and a color level of the second image information of the color sample of the plurality of colors predetermined by the color level difference according to the light source when the color sample of the plurality of colors are read, and (iii) sets the selected color conversion factor group instead of the predetermined color conversion factor group of the conversion unit.

BRIEF DESCRIPTION OF THE DRAWINGS

Exemplary embodiments of the invention will be described in detail based on the following figures, wherein:

FIGS. 7A and 7B are diagrams illustrating a color level variation of each category of an LED that is a light source of an illuminating unit in a basis example according to the first embodiment, wherein FIG. 7A illustrates the upper limit and the lower limit of b* value of yellow color and FIG. 7B illustrates the upper limit and the lower limit of a* value of cyan color;

FIG. 8 is a two-dimensional table illustrating the correspondence relationship between each category and a combination of b* value of yellow color and a* value of cyan color illustrated in FIGS. 7A and 7B;

FIGS. 9A and 9B are diagrams illustrating a* value and b* value of yellow color and a* value and b* value of cyan color of seven LEDs in each category, wherein FIG. 9A illustrates a* value and b* value of a yellow color and FIG. 9B illustrates a* value and b* value of a cyan color;

FIG. 10 is a two-dimensional table illustrating the correspondence relationship between each category and a combination of b* value of yellow color and a* value of cyan color illustrated in FIGS. 9A and 9B;

DETAILED DESCRIPTION

First Embodiment

Hereinafter, embodiments of the present invention will be described with reference to the accompanying drawings.

Figure 1:
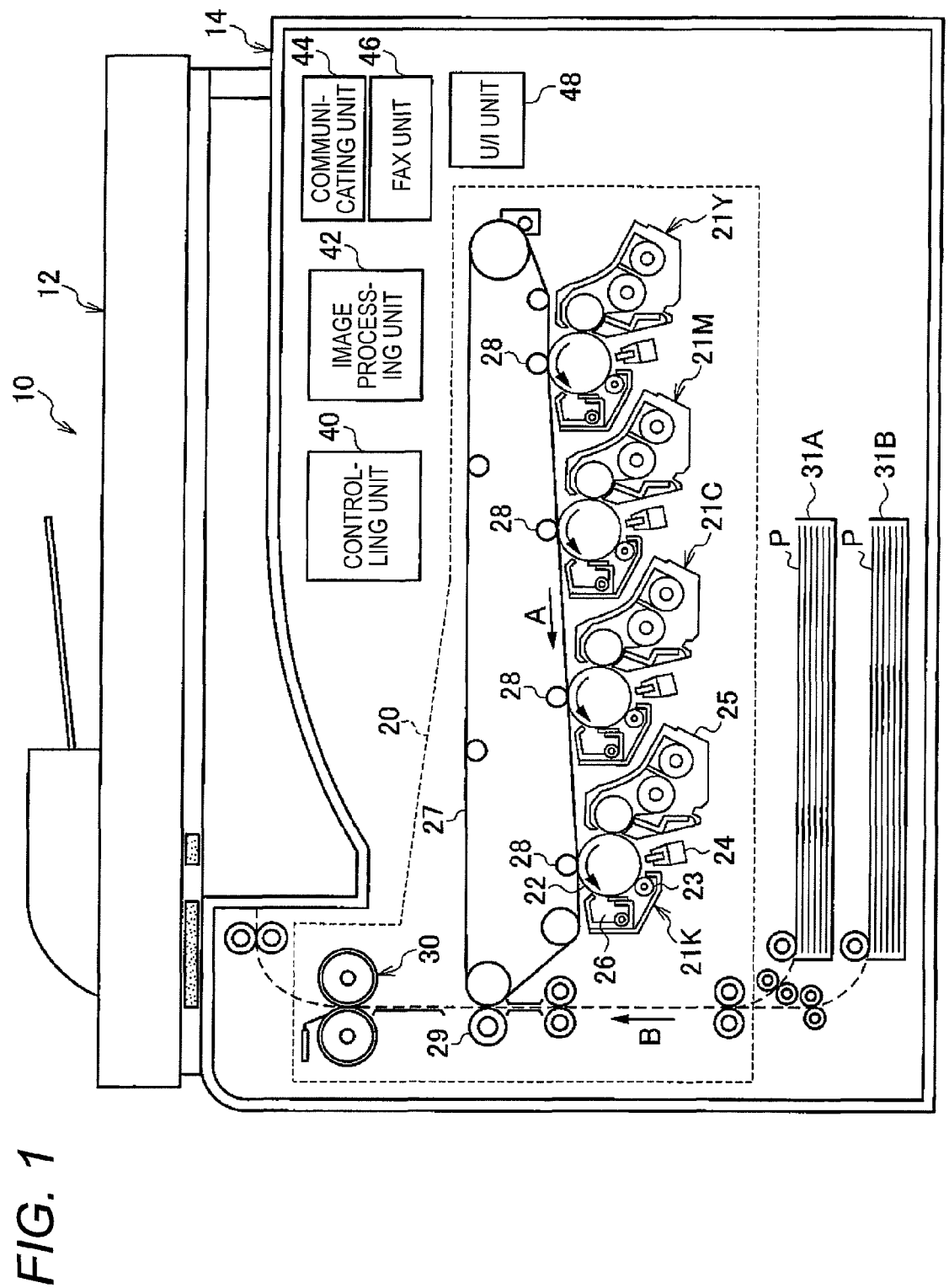
FIG. 1 is a schematic configuration illustrating an overall configuration of an exemplary image forming apparatus according to a first embodiment of the present invention.

An image forming apparatus according to an embodiment of the present invention will be schematically described with reference FIG. 1. FIG. 1 illustrates an overall schematic configuration of an exemplary image forming apparatus according to the present embodiment.

Referring to FIG. 1, an image forming apparatus 10 according to the present embodiment is an all-in-one functional apparatus including a copy function, a print function, a facsimile function, or the like. The image forming apparatus 10 includes an image reading apparatus 12 and an image forming apparatus unit 14.

First, the image forming apparatus unit 14 will be described. The image forming apparatus unit 14 includes an image forming unit 20 configured to form an image on the basis of image data of each color, a controlling unit 40 configured to control an overall operation of the image forming apparatus 10, and a communicating unit 44 configured to receive image data from an external device such as a PC through a network such as, for example, a Local Area Network (LAN), a Wide Area Network (WAN), and the Internet. The image forming apparatus unit 14 further includes a facsimile (FAX) unit 46 configured to transmit/receive image data through a public line, an image processing unit 42 configured to perform a predetermined image processing operation on image data received from the image reading apparatus 12, the communicating unit 44, or the like. The image forming apparatus unit 14 also includes a user interface (U/I) unit 48 configured to receive an instruction from a user or provide information about image reading and image forming to the user.

The image forming unit 20 is a functional unit configured to form an image by, for example, an electrophotographic method, and includes four image forming units 21Y, 21M, 21C and 21K (hereinafter, collectively referred to as an image forming unit 21) arranged in parallel. Each image forming unit 21 includes, for example, a photosensitive drum 22 configured to form an electrostatic latent image and retain a toner image, a charger 23 configured to charge the surface of the photosensitive drum 22 to a predetermined potential, a print head 24 configured to expose the photosensitive drum 22 charged by the charger 23 on the basis of image data, a developer 25 configured to develop an electrostatic latent image formed on the photosensitive drum 22, and a cleaner 26 configured to clean the surface of the photosensitive drum 22 after the electrostatic latent image transferring.

The image forming unit 20 further includes an intermediate transfer body 27 configured to multi-transfer each color toner image formed at the photosensitive drum 22 of each image forming unit 21, a primary transfer roller 28 configured to sequentially transfer (primary transferring) each color toner image formed by each image forming unit 21 to the intermediate transfer body 27, a secondary transfer roller 29 configured to collectively transfer (secondary transferring) a toner image transferred and superimposed on the intermediate transfer body to a recording material (recording paper P), and a fixer 30 configured to fix the secondarily transferred image onto the recording paper P.

The image forming unit 21 of the image forming unit 20 forms yellow (Y), magenta (M), cyan (C) and black (K) color toner images by an electrophotographic method. The respective color toner images formed by the image forming unit 21 are sequentially and electrostatically transferred by the primary transfer roller 28 on the intermediate transfer body 27, so that the respective color toners are superimposed to form a combined toner image. The combined toner image on the intermediate transfer body 27 is conveyed to a region where the secondary transfer roller 29 is located according to the movement of the intermediate transfer body 27 (in the direction of an arrow A of FIG. 1), so that the combined toner image is collectively and electrostatically transferred on the recording paper P fed from paper receiving units 31A and 31B (in the direction of an arrow B of FIG. 1). Thereafter, the combined toner image transferred electrostatically on the recording paper P is fixed by the fixer 30 onto the recording paper P.

Figure 2:
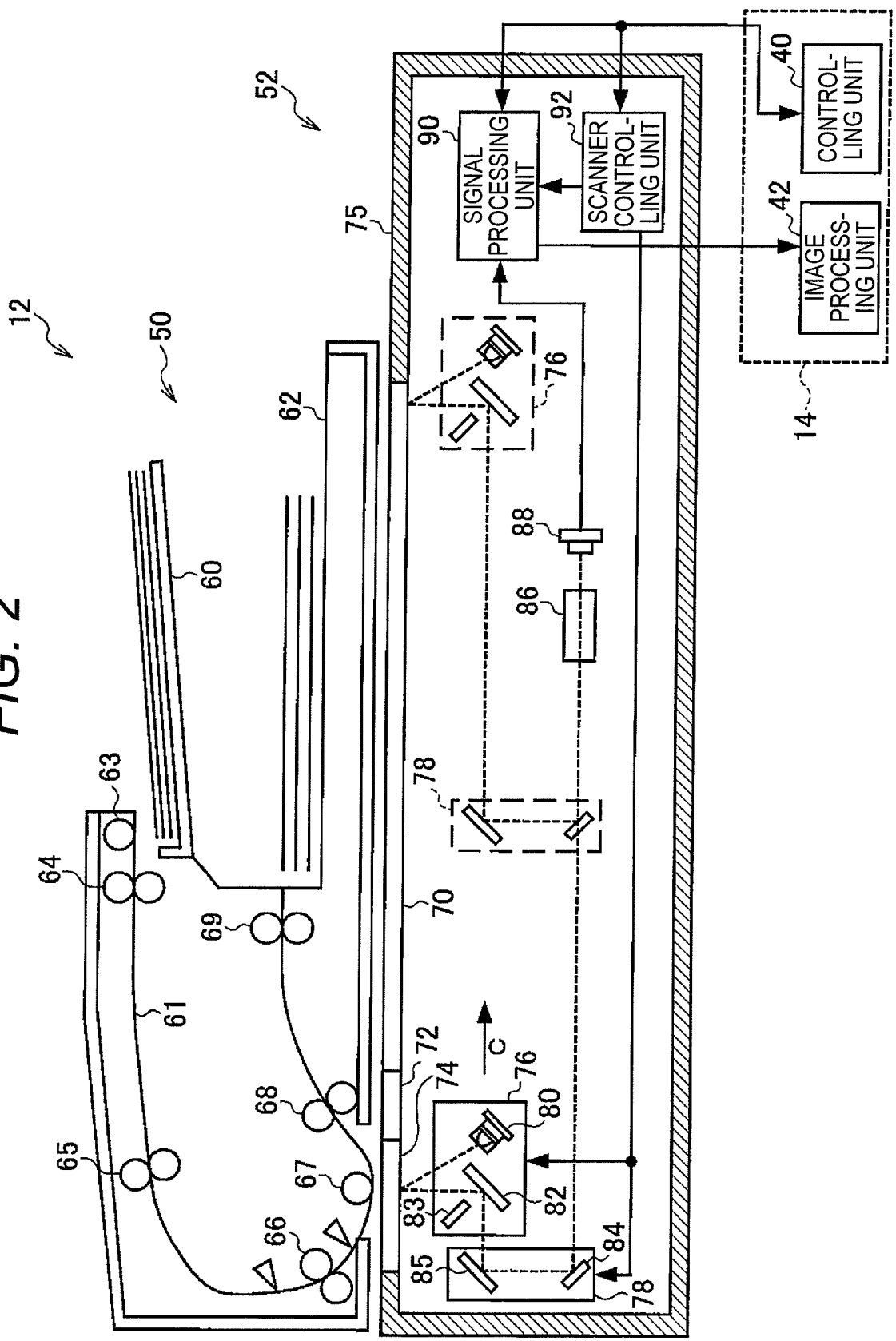
FIG. 2 is a schematic configuration illustrating an exemplary image reading apparatus according to the first embodiment.

Next, the image reading apparatus 12 will be described with reference to FIG. 2. FIG. 2 illustrates a schematic configuration of an exemplary image reading apparatus of the present embodiment. Referring to FIG. 2, the image reading apparatus 12 includes an automatic sheet feeding unit 50 and an image reading processing unit 52 configured to read an image formed on the surface of a sheet.

The automatic sheet feeding unit 50 includes a sheet table 60 on which at least one sheet of document is placed, a sheet conveying path 61 configured to convey a sheet, and an ejection table 62 onto which a sheet is ejected after image reading.

The sheet conveying path 61 is formed in a U-shape. A paper delivering roller 63, a delivering roller 64, a pre-registration roller 65, a registration roller 66, a platen roller 67, an outer roller 68, and an ejecting roller 69 are installed around the sheet conveying path 61. In a sheet feeding mode, the paper delivering roller 63 descends and picks up a sheet placed on the sheet table 60. The delivering roller 64 delivers the uppermost sheet among the sheets delivered from the paper delivering roller 63, to the inside. The pre-registration roller 65 temporarily stops a sheet delivered from the delivering roller 64, and performs inclination correction. The registration roller 66 temporarily stops a sheet delivered from the pre-registration roller 65, and adjusts read timing. The platen roller 67 makes a sheet, which has passed through the sheet conveying path 61, to be confronted with a second platen glass 74. The outer roller 68 and the ejecting roller 69 discharge a read-out sheet onto the ejection table 62.

The image reading apparatus 12 of the present embodiment includes a function for skimming the surface of a sheet fed from the sheet table 60 by the automatic sheet feeding unit 50, and a function for reading the surface of a sheet placed on a first platen glass 70.

The image read processing unit 52 of the present embodiment includes a CCD image sensor 88, a signal processing unit 90, a scanner controlling unit 92 and so on in a case 75.

As illustrated in FIG. 2, the first platen glass 70, a white reference plate 72, and the second platen glass 74 are installed at the side of the case 75 opposite to the automatic sheet feeding unit 50. Herein, an image reading target sheet is placed on the first platen glass 70, and the second platen glass 74 serves as an opening for irradiating light onto a sheet to read the sheet being conveyed by the automatic sheet feeding unit 50.

In the case 75, the image reading unit 12 includes a full-rate carriage 76 configured to read an image while stopping at the reading position of the second platen glass 74 or scanning over the first platen glass 70, and a half-rate carriage 78 configured to guide light obtained from the full-rate carriage 76 to the CCD image sensor 88.

The full-rate carriage 76 includes an illuminating unit 80 which includes a light source configured to irradiate light onto a sheet, a diffusive reflecting member 83 configured to diffusively reflect the light output from the illuminating unit 80 toward a sheet surface, a first mirror 82 configured to reflect the reflected light obtained from the sheet surface toward the half-rate carriage 78.

The half-rate carriage 78 includes a second mirror 85 and a third mirror 84 configured to guide the light obtained from the full-rate carriage 76 to the CCD image sensor 88.

Figure 3:
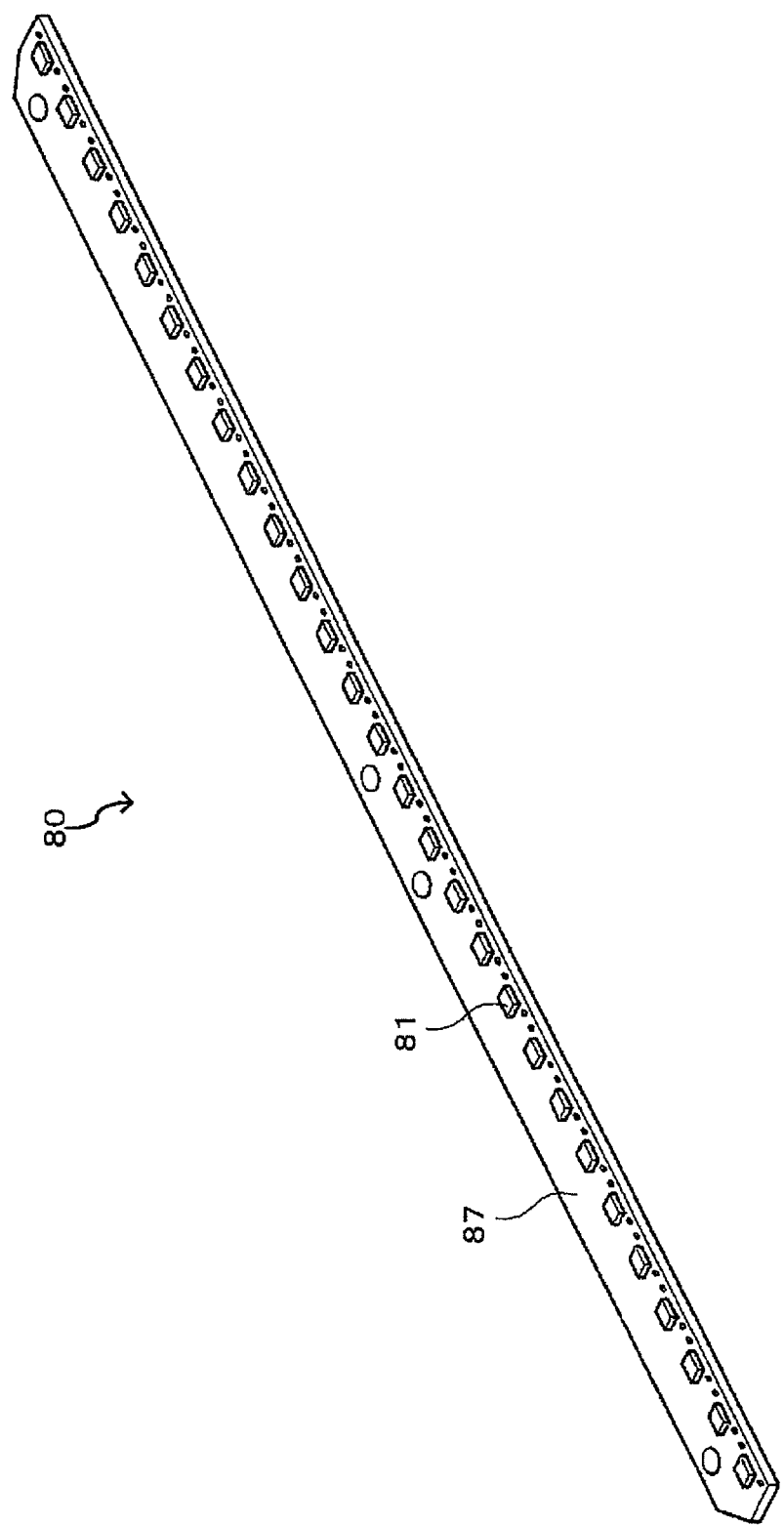
FIG. 3 is a schematic configuration view illustrating an exemplary illuminating unit according to the first embodiment.

The illuminating unit 80 of the present embodiment includes a plurality of white light emitting diodes (hereinafter, referred to as LEDs) arranged as a light source. FIG. 3 illustrates a schematic configuration of the illuminating unit 80 according to an exemplary embodiment. The illuminating unit 80 includes a plurality of LED chips (hereinafter, simply referred to as an LED 81) arranged on a multilayer substrate 87 in a main scanning direction. In the embodiment, a sub scanning direction is defined as a conveying direction of the intermediate transfer body 27 (the direction of the arrow A of FIG. 1), and the main scanning direction is defined as a direction intersecting with the sub scanning direction.

In the present embodiment, the LED 81 is a white LED. Specifically, the LED 81 has a configuration in which a blue LED chip and a transparent resin containing a yellow fluorescent material are laminated. The yellow fluorescent material around the blue LED chip is excited by blue light emitted by the LED chip, thereby generating yellow fluorescent light. Accordingly, the blue light and the yellow light complementary to each other are combined (synthesized) to generate white light.

The CCD (Charge Coupled Device) image sensor 88 of the present embodiment has a function of photoelectrically converting an optical image, which is formed by an imaging lens 86 that optically reduces an optical image obtained from the half-rate carriage 78, and generating charges as R (red), G (green) and B (Blue) color signals (image signals). As an example, in the CCD image sensor 88 of the present embodiment, 3-row arrangement of one-dimensional line sensors for RGB colors is configured as 1 set.

The scanner controlling unit 92 has a function of controlling an overall operation of the image reading apparatus 12. The signal processing unit 90 of the present embodiment has a function of processing each of RGB color image signals from the CCD image sensor 88 to generate image data. The scanner controlling unit 92 and the signal processing unit 90 are connected to the controlling unit 40 and the image processing unit 42 of the image forming apparatus unit 14, respectively, through a signal line to communicate control signals or read-out image data with each other.

In the image reading apparatus 12 of the present embodiment, when reading a document placed on the first platen glass 70, the controlling unit 40 of the image forming apparatus unit 14 instructs the scanner controlling unit 92 to read a document loaded on the first platen glass 70, on the basis of the user's manipulation instruction from the U/I unit 48 of the image forming apparatus unit 14.

Upon receiving a reading instruction of the document loaded on the first platen glass 70 from the controlling unit 40 of the image forming apparatus unit 14, the scanner controlling unit 92 moves the full-rate carriage 76 and the half-rate carriage 78 in the scanning direction (the direction of an arrow C of FIG. 2). Also, the scanner controlling unit 92 turns ON the illuminating unit 80 of the full-rate carriage 76 to irradiate light onto a document surface. By this irradiation, the reflected light from the document is guided to the imaging lens 86 through the first mirror 82, the second mirror 85, and the third mirror 84. The light guided to the imaging lens 86 forms an image on the light receiving surface of the CCD image sensor 88. The CCD image sensor 88 approximately simultaneously performs processing for one line per each of RGB colors. The line-direction reading is performed by scanning throughout the entire document size, thereby completing the readout for one page of document.

The RGB image signals obtained by the CCD image sensor 88 as described above are transferred to the signal processing unit 90.

In the meantime, when reading a document placed on the document table 60 in the image reading apparatus 12, the controlling unit 42 of the image forming apparatus unit 14 instructs the scanner controlling unit 92 to read the document loaded on the document table 60, on the basis of the user's manipulation instruction from the U/I unit 48 of the image forming apparatus unit 14.

Upon receiving a reading instruction of the document placed on the document table 60 from the controlling unit 40 of the image forming apparatus unit 14, the scanner controlling unit 92 conveys the placed document to the reading position M of the second platen glass 74 along the document conveying path 61. At this point, the full-rate carriage 76 and the half-rate carriage 78 are set to stop at the location of a solid line illustrated in FIG. 2. Then, the illuminating unit 80 of the full-rate carriage 76 is turned ON to irradiate light onto a document surface. Accordingly, the reflected light from the document adhered closely to the second platen glass 74 by the platen roller 67 is guided to the imaging lens 86 through the first mirror 82, the second mirror 85, and the third mirror 84.

The light guided to the imaging lens 86 forms an image on the light receiving surface of the CCD image sensor 88. The CCD image sensor 88 approximately simultaneously performs processing for one line per each of RGB colors. One page of document is read out by passing the entire document through the reading position M of the second platen glass 74.

The RGB image signals obtained by the CCD image sensor 88 are transferred to the signal processing unit 90.

The respective members disposed on the light path from the illuminating unit 80 to the CCD image sensor 88, the respective functional units constituting the signal processing unit 90, or other necessary functional units may function as a reading unit for reading light irradiated from the illuminating unit 80 as a light source and reflected from a document as an irradiation target, and generating image information about the irradiation target.

Next, descriptions will be given of the signal processing unit 90 having a function of processing the RGB image signals generated by the CCD image sensor 88.

Figure 4:
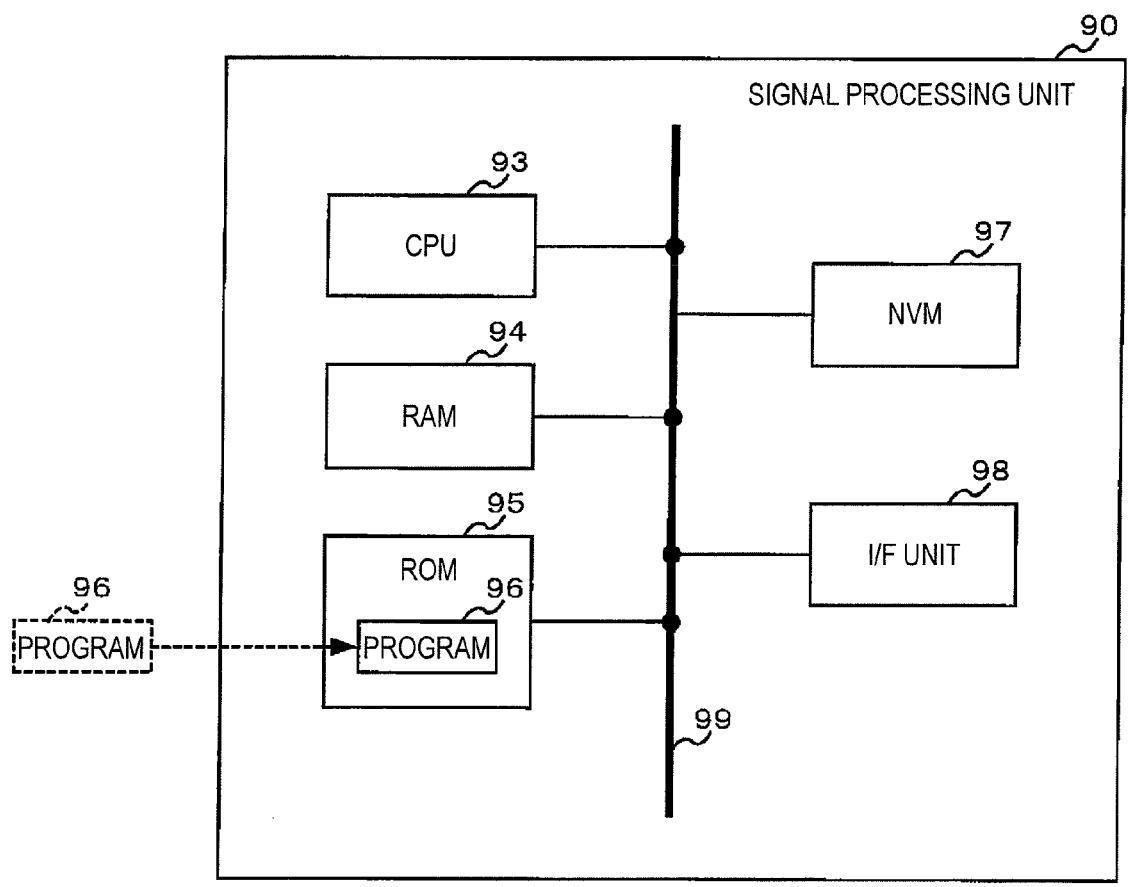
FIG. 4 is a schematic configuration illustrating an exemplary signal processing unit according to the first embodiment.

First, a hardware configuration of the signal processing unit 90 will be described below. FIG. 4 illustrates a schematic configuration of an exemplary signal processing unit 90. The signal processing unit 90 of the present embodiment includes a CPU 93, a RAM 94, a ROM 95, a Non Volatile Memory (NVM) 97, and an I/F unit 98. The CPU 93, the RAM 94, the ROM 95, the NVM 97, and the I/F unit 98 are connected through a bus 99 such as a control bus or a data bus to communicate information or the like with each other.

The CPU 93 has a function of executing a digital operation process according to a predetermined process program in processing an image signal generated by reading a sheet. The RAM 94 is used to secure a working area when a program 96 is executed by the CPU 93. The ROM 95 stores, for example, various setting values used in the process of the CPU 93, and the program 96 for a color conversion parameter setting process, which will be described below in detail. In the present embodiment, the program 96 is executed by the CPU 93 to perform an color conversion parameter setting process, which will be described below in detail. The NVM 97 is a flash memory or the like to which power is supplied by a battery to retain data even when power supply thereto is interrupted. The I/F unit 98 is used to control the input/output of signals to/from each component such as the controlling unit 40 or the image processing unit 42 of the image forming apparatus unit 14 connected to a signal processing unit 90.

Although the program 96 is illustrated as being prestored in the present embodiment, the present invention is not limited thereto. For example, the program 96 may be provided from an external device (not illustrated) and installed in the ROM 95. The program 96 may be transmitted through a network such as the Internet to the signal processing unit 90 and installed in the ROM 95 of the signal processing unit 90. The program 96 may be provided from an external storage medium such as DVD-ROM, flash memory, or USB and installed in the ROM 95.

Figure 5:
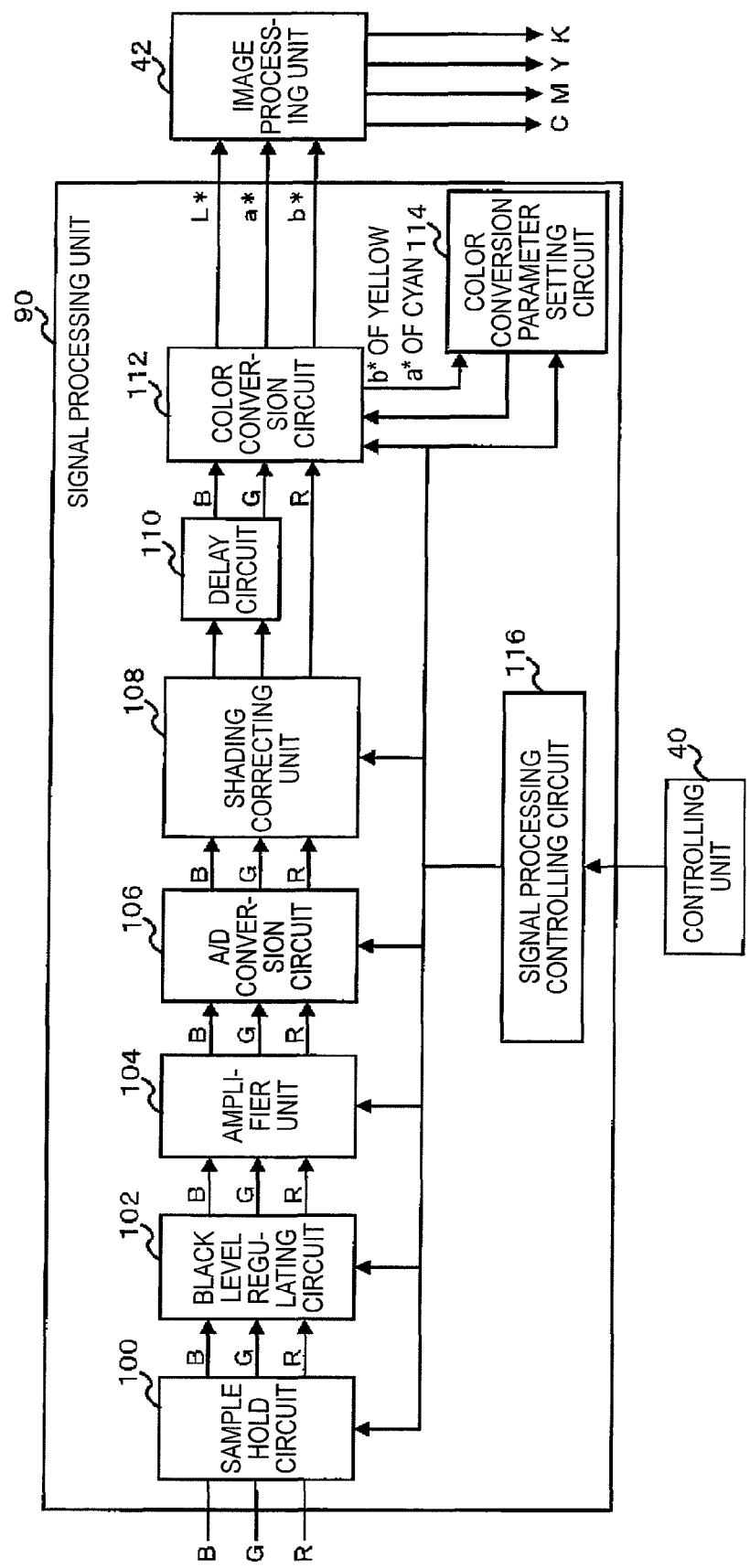
FIG. 5 is a block diagram illustrating a configuration of an exemplary signal processing unit according to the first embodiment.

Next, the function of each circuit included in the signal processing unit 90 according to an embodiment will be described in detail with reference to FIG. 5. FIG. 5 is a functional block diagram illustrating an example of the signal processing unit 90.

As illustrated in FIG. 5, the signal processing unit 90 includes a sample and hold circuit 100, a black level regulating circuit 102, an amplifier circuit 104, an A/D (analog/digital) conversion circuit 106, and a shading correcting circuit 108.

The sample and hold circuit 100 has a function of sampling RGB analog image signals received from the CCD image sensor 88, and holding the same for a predetermined period. The black level regulating circuit 102 has a function of regulating the black level of the output corresponding to the black of a read-out sheet (hereinafter, also referred to as a read sheet) and the black level of the output of the image reading apparatus 12 to be identical (or substantially identical) to each other, with respect to the RGB analog image signals sampled-and-held by the sample and hold circuit 100. The amplifier circuit 104 has a function of amplifying the RGB analog image signals after the black level regulation. The A/D conversion circuit 106 has a function of A/D-converting the RGB analog image signals, amplified by the amplifier circuit 104, into RGB digital image data. The shading correcting circuit 108 has a shading correcting function of correcting a non-uniformity of read-out output caused by the illuminating unit 80 or the CCD image sensor 88 and regulating the black level of the read-out sheet and the black level of the output of the image reading apparatus 12 to be identical (or substantially identical) to each other, with respect to the RGB image data converted by the A/D conversion circuit 106.

The signal processing unit 90 of the present embodiment includes a delay circuit 110, a color conversion circuit 112 as an example of the conversion unit, a color conversion parameter setting circuit 114 as an example of the setting unit, and a signal processing controlling unit 116.

A delay circuit 110 has a function of correcting the reading time difference between the respective image data caused by the position deviation of the RGB one-dimensional line sensors that constitute the CCD image sensor 88 in the sub scanning direction, on the basis of the R image data (image data R).

A color conversion circuit 112 has a color conversion function of converting RGB image data of an RGB color space (a first color space: a device-dependent color space) into L*, a* and b* image data of an L*a*b* color space (a second color space: a device-independent color space) that is a luminance-color difference color space by using color conversion parameters (a color conversion factor group). Herein, for example, the color conversion parameter refers to ones that specifies the correspondence relationship between RGB image data and L*, a* and b* image data when converting RGB image data of an RGB color space into L*, a* and b* image data of an L*a*b* color space. For example, the color conversion process may use a matrix operation or a multi-dimensional (three-dimensional) look-up table (DLUT (Direct Look-Up Table)), but the present invention is not limited thereto.

As an example, the color conversion circuit 112 of the present embodiment is configured to perform a color conversion process by performing a matrix operation according to Equation (1) below. Equation (2) below corresponds to the color conversion parameters of the present embodiment.

The L*, a* and b* image data color-converted by the color conversion circuit 112 are transmitted to the image processing unit 42 of the image forming apparatus unit 14 to be subjected to a color conversion process to CMYK image data of a CMYK color space (a device-dependent color space) that is an output color space. The image processing unit 42 that performs a color conversion process to CMYK image data of the output color space may be installed in the image reading apparatus 12.

[Equation 1]

$$\begin{bmatrix} L \\ a \\ b \end{bmatrix} = M \begin{bmatrix} B \\ G \\ R \\ B^2 \\ G^2 \\ R^2 \\ B \times G \\ G \times R \\ R \times B \end{bmatrix} + \begin{bmatrix} C1 \\ C2 \\ C3 \end{bmatrix} \quad (1)$$

[Equation 2]

$$M = \begin{bmatrix} A_{11} & A_{12} & A_{13} & A_{14} & A_{15} & A_{16} & A_{17} & A_{18} & A_{19} \\ A_{21} & A_{22} & A_{23} & A_{24} & A_{25} & A_{26} & A_{27} & A_{28} & A_{29} \\ A_{31} & A_{32} & A_{33} & A_{34} & A_{35} & A_{36} & A_{37} & A_{38} & A_{39} \end{bmatrix} \quad (2)$$

The L*a*b* image data color-converted by the color conversion circuit 112 are transferred to the image processing unit 42 of the image forming apparatus unit 14 to perform a color conversion process to CMYK image data of a CMYK color space (a device-dependent color space) that is an output color space. The image processing unit 42 performing a color conversion process to CMYK image data of the output color space may be installed in the image reading apparatus 12.

The color conversion parameter setting circuit 114 of the present embodiment has a function of selecting the color conversion parameters used by the color conversion circuit 112 according to the color level variation (difference) of the light generated by the illuminating unit 80, and setting the selected color conversion parameters in the color conversion circuit 112. The color conversion circuit 112 converts RGB image data into L*a*b* image data by using the color conversion parameters set by the color conversion parameter setting circuit 114.

The signal processing controlling circuit 116 has a function of controlling an operation of the sample hold circuit 100, an operation of the black level regulating circuit 102, an operation of the amplifier circuit 104, an operation of the shading correcting circuit 108, an operation of the delay circuit 110, an operation of the color conversion circuit 112, and an operation of the color conversion parameter setting circuit 114 under the control of the controlling unit 40 of the image forming apparatus unit 40.

In the signal processing unit 100, the RGB analog image signals received from the CCD image sensor 88 are sampled by the sample and hold circuit 101, the black levels thereof are regulated by the black level regulating circuit 102, and the regulated signals are amplified to a predetermined signal level by the amplifier circuit 104. The amplified RGB analog image signals are A/D-converted by the A/D conversion circuit 106 to generate RGB digital image data. With respect to the RGB image data, the shading correcting circuit 108 performs correction processing in which the RGB image data are corresponded to the light quantity distribution characteristics of an optical system or the sensitivity change of the one-dimensional line sensors of the CCD image sensor 88, on the basis of image data read from the white reference plate 72.

After the position deviation in the sub scanning direction is corrected by the delay circuit 110, the RGB image data are converted by the color conversion circuit 112 into L*a*b* image data of an L*a*b* color space. At this point, the color conversion parameter setting circuit 114 selects color conversion parameters according to the color level variation of the LED 81 of the illuminating unit 80 and sets the selected color conversion parameters in the color conversion circuit 112. The L*a*b* image data color-converted by the color conversion circuit 112 are transferred to the image processing unit 60 included in the image forming apparatus unit 14.

Figure 6:
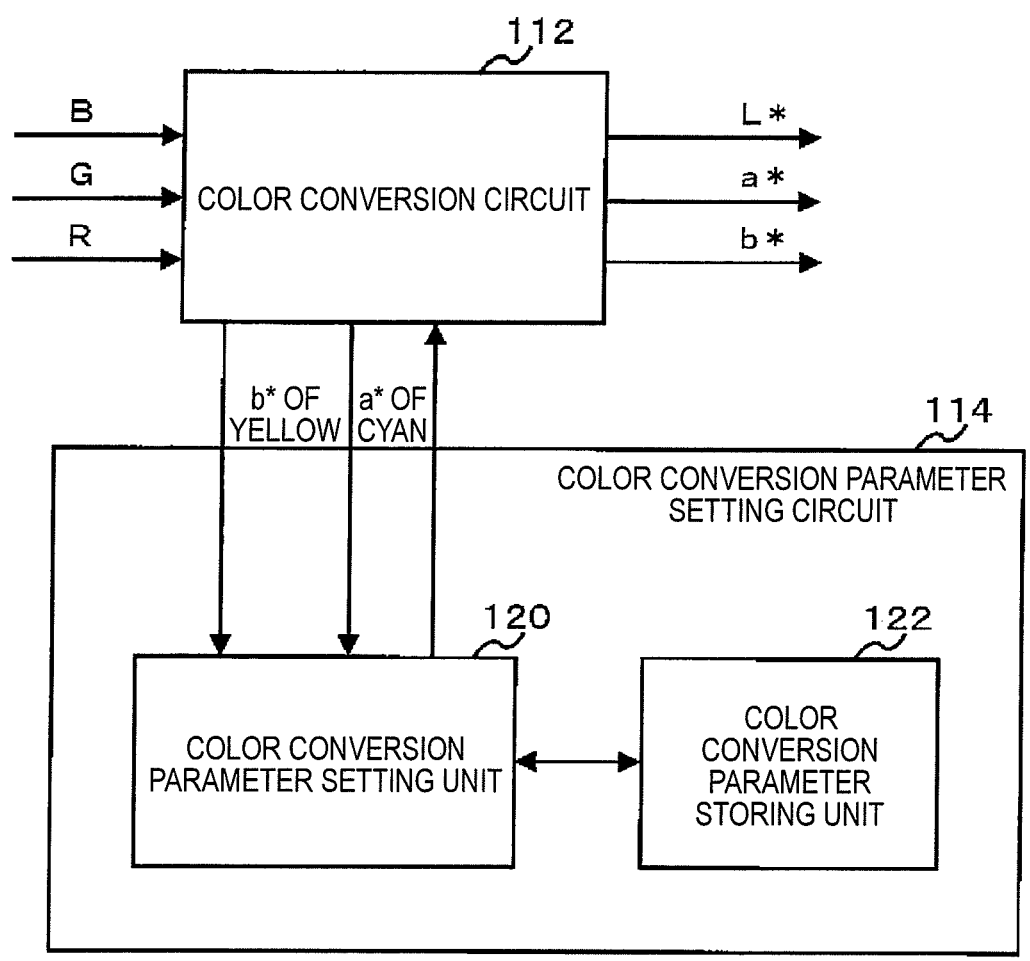
FIG. 6 is a block diagram illustrating a configuration of an exemplary color conversion parameter setting circuit unit according to the first embodiment.

Next, a detailed description will be given of the color conversion parameter setting circuit 114 of the present embodiment included in the signal processing unit 90. FIG. 6 is a block diagram illustrating an example of the color conversion parameter setting circuit 114 according to the present embodiment.

The color conversion parameter setting circuit 114 includes a color conversion parameter setting unit 120 and a color conversion parameter storing unit 122.

The color conversion parameter storing unit 122 has a function of prestoring the correspondence relationship between the color conversion parameter and the color level of the LED 81 of the illuminating unit 80 (which will be described below in derail). For example, the color conversion parameter storing unit 122 is configured by an HDD or the like.

The color conversion parameter setting unit 120 has a function of obtaining the L*a*b* image data, which are generated by color-converting of the RGB image data read out from the color sample utilizing the standard color conversion parameters by the color conversion circuit 112, selecting a color conversion parameter from the color conversion parameters stored in the color conversion parameter storing unit 122 on the basis of the color level (e.g., the L* value, a* value and b* value in this example) of the obtained image data, and setting the selected color conversion parameter in the color conversion circuit 112. If the image data about the read-out document is obtained by setting the color conversion parameter using the color conversion parameter setting unit 120, the color conversion circuit 112 (the signal processing unit 90) performs a color conversion process by using the color conversion parameter set according to the color level variation of the LED 81 of the illuminating unit 80.

Specifically, the color conversion parameter setting unit 120 of the present embodiment obtains b* value that is the color level of image data read from a color sample of yellow color (Y) and a* value that is the color level of image data read from a color sample of cyan color (C), from the color conversion circuit 112. In the present embodiment, it is preferable that the color sample of yellow color is a pure yellow color represented as (R, G, B)=(255, 255, 0) or a similar color. Also, it is preferable that the color sample of a cyan color is a pure cyan color represented as (R, G, B)=(0, 255, 255) or a similar color.

Here, a description will be given of the color level variation of the LED 81 in the illuminating unit 80 and the setting of a color conversion parameter according to the color level variation. Herein, as an example, a detailed description will be given of the color level variation between three types of LEDs 81 (three categories of LED A, LED B and LED C). The three categories of LED A, LED B and LED C are different, for example, in terms of production lot or production date, and there are a plurality of LEDs 81 belonging to each category. If a production lot or a production date is different according to category, there is a variation in the property, the additive amount, or the dispersion state or the like of a yellow fluorescent material constituting the LED 81. The color level of emitted light varies due to the variation, and there may be variation between the categories.

(Basic Example)

FIG. 7A illustrates the upper limit and the lower limit of b* value of image data in an L*a*b* color space, which is converted by the color conversion circuit 112 from RGB image data read from a yellow color sample by using the LED 81 of each category (hereinafter, referred to as b* value of yellow color). FIG. 7B illustrates the upper limit and the lower limit of a* value of image data in an L*a*b* color space, which is converted by the color conversion circuit 112 from RGB image data read from a cyan color sample (hereinafter, referred to as a* value of cyan color).

In the category LED A, b* value of yellow color is equal to or greater than 221 and less than 240, and a* value of cyan color is equal to or greater than 51 and less than 70. In the category LED B, b* value of yellow color is equal to or greater than 201 and less than 220, and a* value of cyan color is equal to or greater than 51 and less than 70. In the category LED C, b* value of yellow color is equal to or greater than 201 and less than 220, and a* value of cyan color is equal to or greater than 31 and less than 50.

FIG. 8 is a two-dimensional table illustrating the correspondence relationship between each category and a combination of b* value of yellow color and a* value of cyan color. In the present embodiment, a combination having no corresponding category, among the combinations of b* value of yellow color and a* value of cyan color, is treated as an error (see "Error" in FIG. 8).

In the basic example illustrated in FIGS. 7 and 8, the color conversion parameter setting unit 120 of the color conversion parameter setting circuit 114 obtains b* value of yellow color and a* value of cyan color from the color conversion circuit 112, so that the category of the LED 81 is determined uniformly from the combination of the obtained b* value of yellow color and the obtained a* value of cyan color. In the embodiment, a color conversion parameter according to the property of each category is predetermined, and the correspondence relationship between a color conversion parameter and each category is stored in the color conversion parameter storing unit 122. In the embodiment, when a category is determined, a color conversion parameter according to the category is selected.

When one color level is used, there is a case where the category of the LED 81 of the illuminating unit 80 is not determined from the color level. For example, if only b* value of yellow color is used, the category LED B and the category LED C cannot be discriminated. Also, if only a* value of a cyan color is used, the category LED A and the category LED B cannot be discriminated.

In the mean time, in the present embodiment, two color levels (b* value of yellow color and a* value of cyan color) are used and the correspondence relationship between a category (a color conversion parameter) and a combination of the two color levels is predetermined. Therefore, a color conversion parameter is selected uniformly by obtaining b* value of yellow color and a* value of cyan color.

(Complex Example)

Figure 9A:
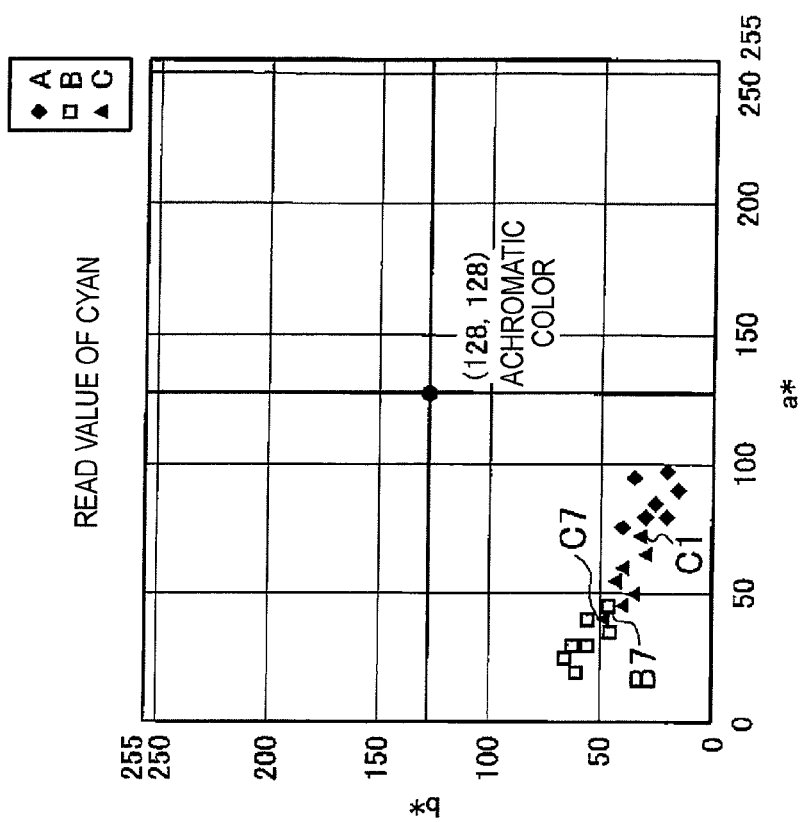
Figure 9B:
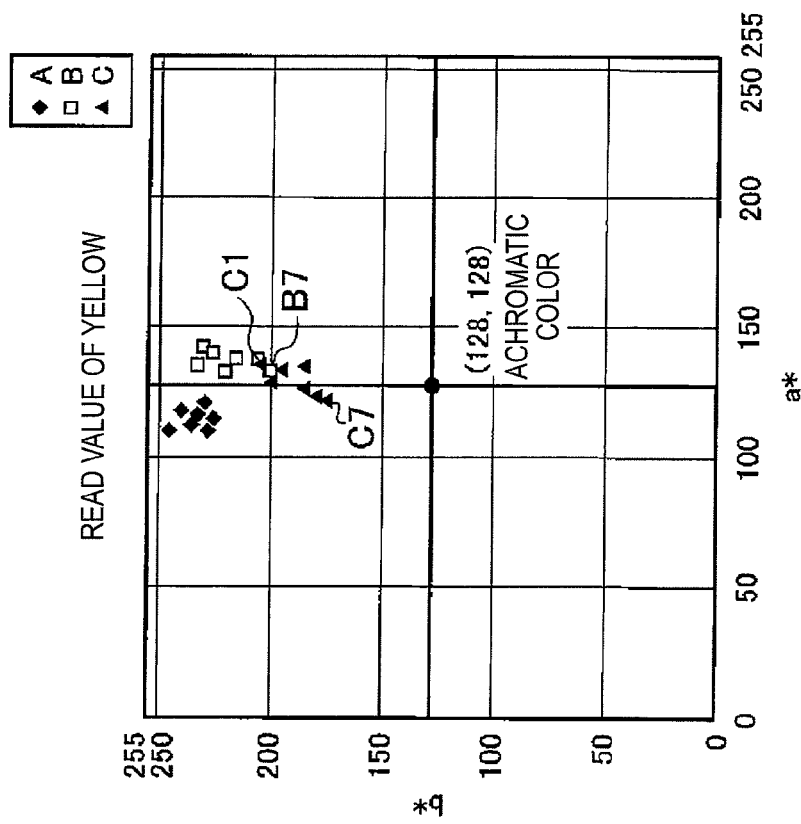

Next, descriptions will be given of the case where the color level variation between the respective categories is more complex than that of the basic example. FIG. 9 is a diagram illustrating a* value and b* value of yellow color, and a* value and b* value of cyan color of seven LEDs 81 as a sample in each category. FIG. 9A illustrates a* value and b* value of yellow color, and FIG. 9B illustrates a* value and b* value of cyan color. In FIG. 9, (a*, b*)=(128, 128) is an achromatic color and a color level is represented by a value of 0 to 255.

As illustrated in FIGS. 9A and 9B, one group of the LEDs 81 belonging to the category LED B and one group of the LEDs 81 belonging to the category LED C are partially overlapped. As for each LED 81 belonging to each category, a sample B7 of the category LED B in yellow color (FIG. 9A) and a sample C1 of the category LED C are close in property (a* value and b* value), but a sample C1 in cyan color (FIG. 9B) is distant from one group (hereinafter, referred to as B group) of the category LED B, and particularly, a difference in the a* value is significant. A sample C7 in cyan color (FIG. 9B) overlaps with the B group, but it is distant from the B group in yellow color, and particularly, a difference in the b* value is significant. In this way, a two-dimensional table is constructed by extracting a value for each coordinate axis from the respective color samples of two colors in consideration of the tendency of the distribution of each LED 81 (that is, a sample overlapped in yellow color is not overlapped in cyan color, or there is a correlation between a* value and b* value). Accordingly, even in the case in which overlapped colors are existed in the color distribution, the optimal parameter is selected because the color properties of the LEDs 81 are divided into categories as described above. FIG. 10 illustrates an example of a two-dimensional table optimal for the complex example. In FIG. 10, b* value of yellow color and a* value of cyan color having a significant color level difference as described above are used.

As illustrated in FIG. 10, each color level of b* value of yellow color and a* value of cyan color is divided into a plurality of color levels. Accordingly, even in the case of the complex example where the color distribution is partially overlapped, the category of the LED 81 is determined uniformly from the combination of b* value of yellow color and a* value of cyan color, as in the above basic example. In the present embodiment, as in the above basic example, when a category is determined, a color conversion parameter according to the category is selected.

Figure 11:
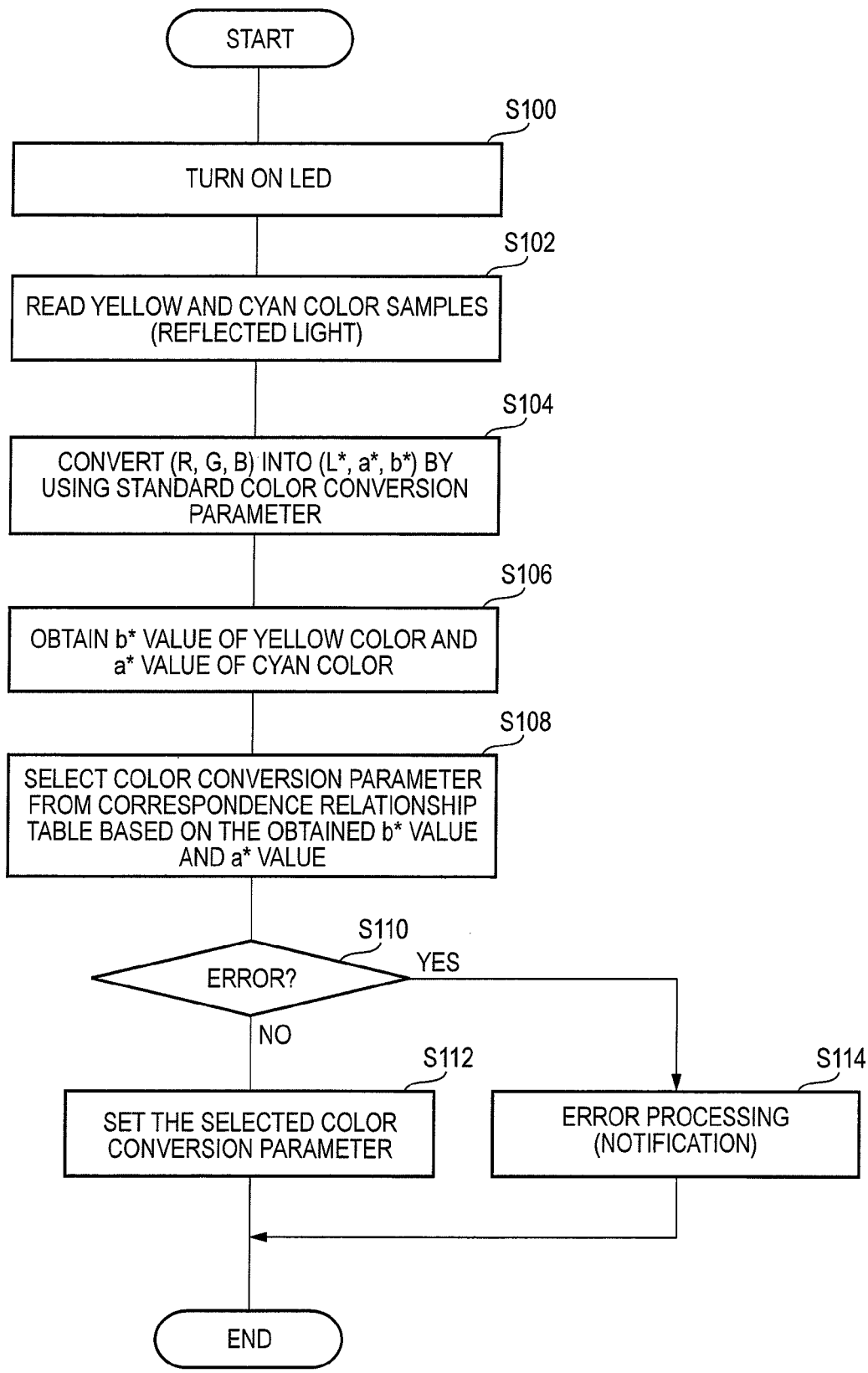
FIG. 11 is a flow chart illustrating an example of a color conversion parameter setting process according to the first embodiment.

Next, descriptions will be given of a color conversion parameter setting process in the image reading apparatus 12 of the present embodiment. FIG. 11 is a flow chart illustrating an exemplary color conversion parameter setting process of the embodiment. The color conversion parameter setting process is executed when an instruction is received from a user by the U/I unit 48. The user places a document in which a yellow and cyan color sample is described (hereinafter, referred to as a color sample) on the document table 60 or the first platen glass 70, and instructs the reading of a color sample.

When the reading of a color sample is instructed, the full-rate carriage 76 is moved and stopped at the reading position of a color sample and the illuminating unit 80 is controlled to turn ON the LED 81 as a light source, at step S100.

At next step S102, an instruction is given to read the reflected light of a yellow color sample and a cyan color sample. The light emitted from the LED 81 is reflected from the yellow color sample and the cyan color sample, and the reflected light is guided to the CCD image sensor 88. The RGB image signals that are read out from the yellow color sample and the cyan color sample obtained by the CCD image sensor 88 are transferred to the signal processing unit 90.

At next step S104, the color conversion circuit 112 is instructed to convert the RGB image data of an RGB color space into L*a*b* image data of an L*a*b* color space by using the standard color conversion parameter. The signal processing unit 90 sequentially performs the above process with respect to the transferred RGB image signals, and the color conversion circuit 112 performs a color conversion process of the RGB image data. Herein, the color conversion circuit 112 performs a color conversion process by using a standard color conversion parameter. In this case, the color conversion circuit 112 performs a color conversion process with a preset standard color conversion parameter. In the present embodiment, the standard color conversion parameter is a color conversion parameter preset as an initial value, and generated using the LED 81 with a target color level (a target value of a color level) as a light source. That is, if the color level of the LED 81 is a target color level, the standard color conversion parameter is used to execute a color conversion process from target RGB image data to L*a*b* image data.

At next step S106, the color conversion parameter setting circuit 114 is instructed to obtain b* value of yellow color and a* value of cyan color from the color conversion circuit 112. Among L*a*b* image data of the yellow color samples and the cyan color samples converted by the color conversion circuit 112, b* value of yellow color and a* value of cyan color are obtained by the color conversion parameter setting circuit 114.

At next step S108, on the basis of the obtained yellow b* value and cyan a* value, the color conversion parameter setting circuit 114 is instructed to select a color conversion parameter from the correspondence relationship table stored in the color conversion parameter storing unit 122. The color conversion parameter setting unit 120 of the color conversion parameter setting circuit 114 selects a color conversion parameter corresponding to a combination of the obtained yellow b* value and cyan a* value on the basis of the correspondence relationship table (for example, FIGS. 8 and 10) stored in the conversion parameter storing unit 122. In the present embodiment, as described above, a category corresponding to a combination of a yellow b* value and a cyan a* value is determined from the correspondence relationship table stored in the color conversion parameter storing unit 122, and a color conversion parameter corresponding to the determined category is selected. In the present embodiment, although the illuminating unit 80 includes a plurality of LEDs 81 as a light source (see FIG. 3), one color conversion parameter is selected for all of the LEDs 81 included in the illuminating unit 80.

At next step S110, it is determined whether an error is selected. In the present embodiment, as described above, when a combination of a yellow b* value and a cyan a* value is not suitable, an error (see "Error" of FIGS. 8 and 10) is selected. When a color conversion parameter is selected instead of an error, a negative determination is made and the process proceeds to step S112. The selected color conversion parameter is set in the color conversion circuit 112 at step S112, and the process is ended. Accordingly, the color conversion parameter according to the color level of the LED 81 of the illuminating unit 80 is set in the color conversion circuit 112. Thereafter, when a document is read out, the color conversion circuit 112 performs a suitable conversion because the color conversion process is performed using the set color conversion parameter.

In the mean time, when an error is selected, an affirmative determination is made and the process proceeds to step S114. A predetermined error process is performed, and the process is ended. In the present embodiment, when an error is selected, a purpose thereof is notified to the user. For example, the purpose is notified to demand to check whether a color sample is accurately placed at the reading position of a document. By this notification, the user again places the color sample on the document table 60 or the first platen glass 70 and instructs to read the color sample by the U/I unit 48. When the reading of the color sample is again instructed, the above process is repeated.

In the present embodiment, when an error is selected, the color conversion circuit 112 maintains the setting state of the standard color conversion parameter. As such, when a combination of the obtained yellow b* value and cyan a* value is considered as an error, a purpose thereof is notified to the user and the color conversion circuit 112 maintains the setting state of the standard color conversion parameter. Therefore, the setting of an unsuitable color conversion parameter in the color conversion circuit 112 is suppressed.

As described above, in the image reading apparatus 12 of the image forming apparatus 10 of the present embodiment, the signal processing unit 90 includes the color conversion parameter setting circuit 114, and the color conversion parameter setting circuit 114 includes the color conversion parameter setting unit 120 and the color conversion parameter storing unit 122. The color conversion parameter storing unit 122 pre-stores the correspondence relationship table of the combination of the b* value of the yellow color and the a* value of the cyan color and the color conversion parameter (category). In the color conversion parameter setting process, color conversion of RGB image data that is read out from the yellow color sample and the cyan color sample into L*a*b* image data is performed by the color conversion circuit 112. The color conversion parameter setting unit 120 of the color conversion parameter setting circuit 114 obtains the b* value of the yellow color and the a* value of the cyan color from the color conversion parameter setting circuit 114. The color conversion parameter setting unit 120 selects a color conversion parameter corresponding to the combination of the obtained yellow b* value and cyan a* value on the basis of the correspondence relationship table stored in the color conversion parameter storing unit 122.

As such, in the present invention, the color conversion parameter corresponding to the combination of the obtained b* value of the yellow color and the obtained a* value of the cyan color is selected. Therefore, the appropriate color conversion parameter is selected with respect to the color level difference according to the category of the LED 81 that is the light source, and is set in the color conversion circuit 112.

Accordingly, the color conversion circuit 112 performs the color space conversion by the appropriate color conversion parameters with respect to the color level difference according to the category of the LED 81 of the illuminating unit 80. As a result, in each image reading apparatus 12, the color variation of L*a*b* image data that has been subjected to color conversion process is suppressed, and the color conversion precision of the color conversion circuit 112 (image reading apparatus 12) is improved.

Second Embodiment

The second embodiment is different from the first embodiment in that the color conversion parameter setting process and the color conversion parameters stored in the color conversion parameter storing unit 122 according to the color conversion parameter setting process are different. Accordingly, the different configuration, process and operation will be described herein in detail, but for the configuration and operation approximately similar to the first embodiment, the same symbols are assigned and a detailed description thereof will be omitted. Since the configurations of the image forming apparatus 10, the image reading apparatus 12, and the image forming apparatus unit 14 according to the present embodiment are approximately identical to that of the first embodiment, a detailed description thereof will be omitted herein.

Figure 12:
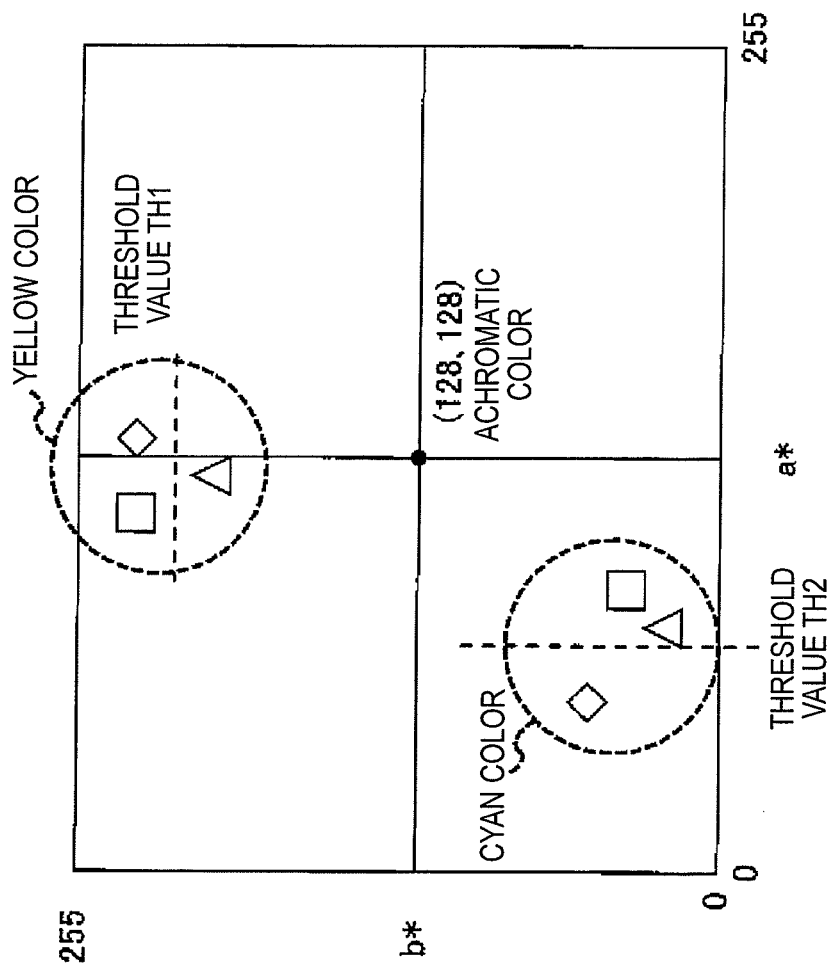
FIG. 12 is a diagram illustrating the distribution of b* value of yellow color and a* value of cyan color in each category and the relationship between a threshold value TH1 and a threshold value TH2 according to a second embodiment of the present invention.

First, the correspondence relationship between a color level variation of LEDs 81 of an illuminating unit 80 and color conversion parameters will be described. As in the first embodiment, a color level variation between three kinds of LEDs 81 (three categories of LED A, LED B, and LED C) will be taken as an example and described in detail. FIG. 12 illustrates the distribution of b* value of yellow color and a* value of cyan color in each category of the present embodiment.

In the distribution of the b* value of the yellow color, the category LED A and the category LED b are equal to or greater than a threshold value TH1, and the category LED C is less than the threshold value TH1. From this, when the b* value of the yellow color obtained from a color conversion circuit 112 is less than the threshold value TH1, the category of the LED 81 is determined as the category LED C. Therefore, the category LED C is uniformly determined by the condition (condition 1) that the b* value of the yellow color is less than the threshold value TH1.

Meanwhile, in the distribution of the a* value of the cyan color, the category LED A is less than a threshold value TH2, and the category LED B and the category LED C are equal to or greater than the threshold value TH2. For this, when the a* value of the cyan color obtained from the color conversion circuit 112 is less than the threshold value TH2, the category of the LED 81 is determined as the category LED A. Therefore, the category LED A and the category LED B are uniformly determined by the condition (condition 2) that the a* value of the cyan color is less than the threshold value TH2.

In the present embodiment, the correspondence relationship between the threshold values (threshold value TH1 and TH2) for dividing the category and the category (color conversion parameters) is configured to be converted into a correspondence relationship table of the combination of the color levels (the b* value of the yellow color and the a* value of the cyan color) and the color conversion parameters of the first embodiment, and to be prestored in the color conversion parameter storing unit 122.

Figure 13:
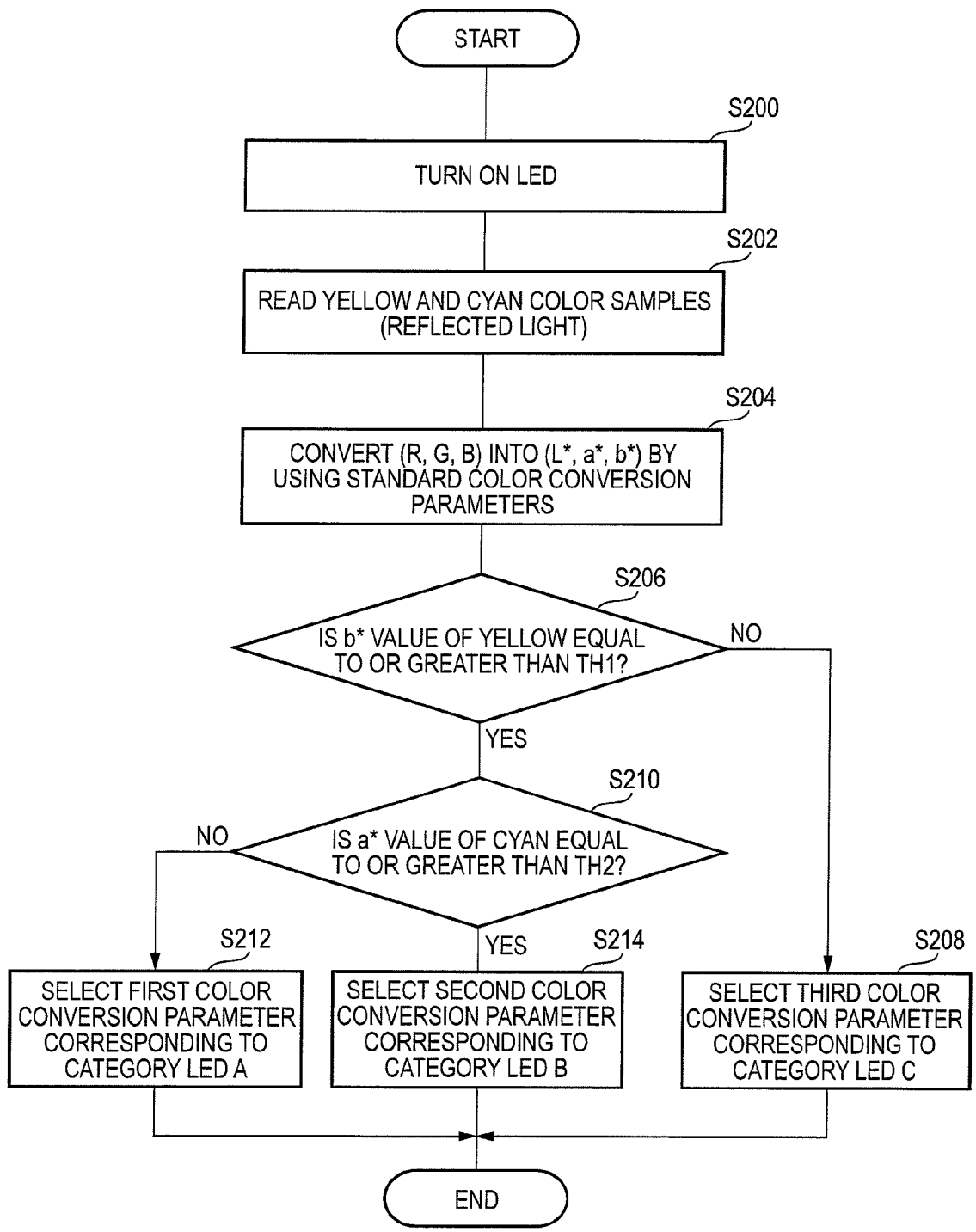
FIG. 13 is a flow chart illustrating an example of a color conversion parameter setting process according to the second embodiment.

Next, a color conversion parameter setting process in a signal processing unit 90 of the image reading apparatus 12 of the present embodiment will be described. FIG. 13 is a flow chart illustrating an exemplary color conversion parameter setting process that is executed in the signal processing unit 90 of the present embodiment.

Steps S200 to S204 of the color conversion parameter setting process (FIG. 13) of the present embodiment correspond to steps S100 to S104 of the color conversion parameter setting process (FIG. 11) of the first embodiment, respectively. That is, as in the first embodiment, when a reading of a color sample is instructed, the LED 81, which is the light source of the illuminating unit 80, is turned ON, and a color conversion process in which RGB image data that are read from reflected light of the yellow and cyan color samples are converted into L*a*b* image data is performed.

At next step S206, it is determined whether the b* value of the yellow color is equal to or greater than the threshold value TH1. That is, the determination is made based on the condition 1. First, the color conversion parameter setting unit 120 of the color conversion parameter setting circuit 114 obtains the b* value of the yellow color from the color conversion circuit 112 and determines whether the b* value of the obtained yellow color is equal to or greater than the threshold value TH1. When the obtained b* value of the yellow color is less than the threshold value TH1, a negative determination is made and the process proceeds to step S208.

As described above, when the b* value of the yellow color is less than the threshold value TH1, it is determined as the category LED C. Therefore, at step S208, it is determined as the category LED C, the color conversion parameter (third color conversion parameter) corresponding to the category LED C is selected, and then this process is ended.

Meanwhile, when the b* value of the yellow color is equal to or greater than the threshold value TH1, a positive determination is made and the process proceeds to step S210. At step S210, it is determined whether the a* value of the cyan color is equal to or greater than the threshold value TH2. That is, the determination is made based on the condition 2. Next, the color conversion parameter setting unit 120 of the color conversion parameter setting circuit 114 obtains the a* value of the cyan color from the color conversion circuit 112 and determines whether the obtained a* value of the cyan color is equal to or greater than the threshold value TH2. When the obtained a* value of the cyan color is less than the threshold value TH2, the process proceeds to step S212.

As described above, when the a* value of the cyan color is less than the threshold value TH2, it is determined as the category LED A. Therefore, at step S212, it is determined as the category LED A, the color conversion parameter (first color conversion parameter) corresponding to the category LED A is selected, and then this process is ended.

Meanwhile, when the obtained a* value of the cyan color is equal to or greater than the threshold value TH2, an affirmative determination is made and the process proceeds to step S214. As described above, when the a* value of the cyan color is equal to or greater than the threshold value TH2, it is determined as the category LED B. Therefore, at step S214, it is determined as the category LED B, the color conversion parameter (second color conversion parameter) corresponding to the category LED B is selected, and then this process is ended.

As described above, the color conversion parameter storing unit 122 of the color conversion parameter setting circuit 114 in the image reading apparatus 12 of the present embodiment pre-stores the correspondence relationship of the threshold value TH1 in the b* value of the yellow color and the color conversion parameter (category), and the correspondence relationship of the threshold value TH2 in the a* value of the cyan color and the color conversion parameter (category). In the color conversion parameter setting process, a color conversion process in which RGB image data that are read out from the yellow color sample and the cyan color sample are converted into L*a*b* image data is performed by the color conversion circuit 112. The color conversion parameter setting unit 120 of the color conversion parameter setting circuit 114 obtains the b* value of the yellow color and determines whether the obtained b* value of the yellow color is equal to or greater than the threshold value TH1. When the b* value of the yellow color is less than the threshold value TH1, it is determined as the category LED C, and the corresponding third color conversion parameter is selected and set in the color conversion circuit 112. When the b* value of the yellow color is equal to or greater than the threshold value TH1, the a* value of the cyan color is obtained and it is determined whether the obtained a* value of the cyan color is equal to or greater than the threshold value TH2. When the a* value of the cyan color is less than the threshold value TH2, it is determined as the category LED B, and the corresponding second color conversion parameter is selected and set in the color conversion circuit 112. Meanwhile, when the a* value of the cyan color is equal to or greater than the threshold value TH2, it is determined as the category LED A, and the corresponding first color conversion parameter is selected and set in the color conversion circuit 112.

As such, in the present embodiment, the color conversion parameter is selected by individually determining whether the b* value of the yellow color and the a* value of the cyan color are equal to or greater than the set threshold values (threshold values TH1 and TH2). Therefore, with respect to the color level difference according to the category of the LED 81, which is the light source, appropriate color conversion parameters are selected and set in the color conversion circuit 112.

Therefore, the color conversion circuit 112 performs the color space conversion by the appropriate color conversion parameters with respect to the color level difference according to the category of the LED 81 of the illuminating unit 80. As a result, in each image reading apparatus 12, the color variation of the color-converted L*a*b* image data is suppressed, and the color conversion precision of the color conversion circuit 112 (image reading apparatus 12) is improved.

In the present embodiment, when the obtained b* value of the yellow color is less than the threshold value TH1, it is configured to select the category LED C (third color conversion parameter), but the embodiment is not limited thereto. In this case, when the a* value of the cyan color is obtained and the obtained a* value of the cyan color is equal to or greater than the threshold value TH2, the category LED C (third color conversion parameter) is selected. However, when the a* value of the cyan color is less than the threshold value TH2, it may be determined as an error (see the first embodiment). As in the present embodiment, when the category is determined by the condition 1, the condition 2 (determination as to whether the a* value of the cyan color is less than the threshold value TH2) is not performed. Therefore, the process speed of the color conversion parameter setting process is improved.

In each embodiment, the color conversion circuit 112 is configured to perform the color conversion process by performing a matrix operation, and the case where the color conversion parameter is the Equation (2) has been described. However, the embodiment is not limited thereto. The color conversion circuit 112 may be configured to perform other color conversion processes. For example, as an example of the color conversion parameters, the color conversion process may be performed using a multi-dimensional (three-dimensional) Direct Look-Up Table (DLUT) that is utilized in a color conversion process in which RGB is converted into L*a*b*. In this case, the DLUT corresponds to the color conversion parameter.

In each embodiment as described above, the case where the combination of the b* value of the yellow color and the a* value of the cyan color corresponds to the color conversion parameter (category) has been described, but the embodiments are not limited thereto. For example, regarding the color, colors other than the yellow color and the cyan color may be used. Regarding the color level, other values than the b* value and the a* value may be used. The color distribution characteristic according to the category of the LED 81 included in the illuminating unit 80 (see FIGS. 9 and 12) is obtained, and the color level (axis) showing a significant difference between the categories may be used according to the color distribution characteristic. In addition, three or more color levels may be combined.

In each embodiment, the color conversion circuit 112 is configured to perform the color conversion process of converting the RBG color space into the L*a*b* color space, but the embodiments are not limited thereto. There is no special limitation as long as the color conversion circuit performs the color conversion process of converting the RGB color space into a color space independent of a device.

In each embodiment, the case that performs the color conversion parameter setting process by reading out the color sample is described, but the embodiments are not limited thereto. Instead of the color sample, reference plates having the same color as the color samples within the image forming apparatus 10 (for example, a yellow color reference plate and a cyan color reference plate) are installed, and reflected light from the reference plates may be read out.

In each embodiment, one color conversion parameter is set with respect to the LED 81 of the illuminating unit 80, but the embodiments are not limited thereto. Color conversion parameters may be set according to a difference of each color level of a plurality of LEDs 81 included in the illuminating unit 80. A plurality of LEDs 81 may be divided into several groups (for example, division based on a control), and a color conversion parameter may be set for each group.

The configuration, operation, and color conversion parameter setting process of the image forming apparatus 10 or the image reading apparatus 12, the image forming apparatus unit 14, and so on, which have been described in the first embodiment and the second embodiment, are exemplary and it is apparent that they may be modified according to situations, without departing from the gist of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
    a conversion unit configured to convert first image information into second image information by using a predetermined color conversion factor group,
        wherein the first image information represents color levels in a first color space, and the second image information represents color levels in a second color space which is different from the first color space; and
    a setting unit configured to:
        obtain the second image information of at least two color samples for correcting color level differences of a light source,
            wherein the obtained second information of the color samples comprises at least two color levels converted by the conversion unit from the first image information of the color samples, and
            wherein the first image information of the color samples is generated by reading light irradiated from the light source and reflected from the color samples,
        select a corrected color conversion factor group corresponding to the obtained second image information of the color samples, from among a plurality of previously stored color conversion factor groups, using a correspondence relationship between the plurality of previously stored color conversion factor groups and a combination of the at least two color levels comprising the obtained second image information of the color samples,
            wherein the correspondence relationship is predetermined by differences in the at least two color levels exhibited by different categories of light sources that may be used as the light source when light reflected from the color samples is read using the different categories of light sources, and
        set the conversion unit to use the selected corrected color conversion factor group instead of the predetermined color conversion factor group.

2. The image reading apparatus of claim 1, wherein the correspondence relationship comprises a correspondence relationship table which represents the correspondence relationship between each one of the plurality of previously stored color conversion factor groups and the combination of the at least two color levels comprising the obtained second image information of the color samples.

3. The image reading apparatus of claim 1, wherein
    the correspondence relationship comprises a correspondence relationship between each one of the plurality of previously stored color conversion factor groups and respective threshold color level values predetermined for each of the at least two color levels, and
    the setting unit is configured to select the corrected color conversion factor group using a result of a determination as to whether the at least to color levels comprising the obtained second image information of the color samples are greater than the threshold color level values.

4. The image reading apparatus of claim 1, wherein
    the setting unit is configured to perform a predetermined process in response to determining that the combination of the at least two color levels comprising the obtained second image information of the color samples does not correspond to one of the plurality of previously stored color conversion factor groups using the correspondence relationship.

5. The image reading apparatus of claim 1, wherein
    the at least two color levels comprising the obtained second image information of the color samples includes a yellow color and a cyan color,
    the second color space includes an $L^*a^*b^*$ color space, and
    the setting unit is configured to obtain a $b^*$ value corresponding to a color level of the yellow color and an $a^*$ value corresponding to a color level of the cyan color as the obtained second image information of the color samples.

6. An image forming apparatus, comprising:
    a reading unit;
    an image reading apparatus; and
    an image forming unit,
    wherein the image reading apparatus comprises:
        a conversion unit configured to convert first image information generated by the reading unit into second image information by using a predetermined color conversion factor group,
            wherein the first image information represents color levels in a first color space, and the second image information represents color levels in a second color space which is different from the first color space; and
        a setting unit configured to:
            obtain the second image information of at least two color samples for correcting color level differences of a light source,
                wherein the obtained second information of the color samples comprises at least two color levels converted by the conversion unit from first image information of the color samples, and
                wherein the first image information of the color samples is generated by the reading unit reading light irradiated from the light source and reflected from the color samples,
            select a corrected color conversion factor group corresponding to the obtained second image information of the color samples, from among a plurality of previously stored color conversion factor groups, using a correspondence relationship between the plurality of previously stored color conversion factor groups and a combination of the at least two color levels comprising the obtained second image information of the color samples, wherein the correspondence relationship is predetermined by differences in the at least two color levels exhibited by different categories of light sources when light reflected from the color samples is read using the different categories of light sources, and set the conversion unit to use the selected corrected color conversion factor group instead of the predetermined color conversion factor group, wherein the image forming unit forms an image based on the second image information converted by the image reading apparatus.

7. A non-transitory computer-readable medium storing a program that causes a computer to execute image reading processing, the image reading processing comprising:

converting first image information into second image information by using a predetermined color conversion factor group, wherein the first image information represents color levels in a first color space, and the second image information represents color levels in a second color space which is different from the first color space;

obtaining the second image information of at least two color samples for correcting color level differences of a light source, wherein the obtained second information of the color samples comprises at least two color levels converted from first image information of the color samples, and wherein the first image information of the color samples is generated by reading light irradiated from the light source and reflected from the color samples;

selecting a corrected color conversion factor group corresponding to the obtained second image information of the color samples, from among a plurality of previously stored color conversion factor groups, using a correspondence relationship between the plurality of previously stored color conversion factor groups and a combination of the at least two color levels comprising the obtained second image information of the color samples, wherein the correspondence relationship is predetermined by differences in the at least two color levels exhibited by different categories of light sources that may be used as the light source when light reflected from the color samples is read using the different categories of light sources; and setting the selected corrected color conversion factor group instead of the predetermined color conversion factor group.

* * * * *